United States Patent
Plantan et al.

(10) Patent No.: US 9,303,705 B2
(45) Date of Patent: Apr. 5, 2016

(54) BRAKE DISC AND MOUNTING ARRANGEMENT FOR A BRAKE DISC

(71) Applicant: Bendix Spicer Foundation Brake LLC, Elyria, OH (US)

(72) Inventors: Ronald Plantan, Elyria, OH (US); Carolyn Dute, Elyria, OH (US)

(73) Assignee: Bendix Spicer Foundation Brake LLC, Elyria, OH (US)

( * ) Notice: Subject to any disclaimer, the term of this patent is extended or adjusted under 35 U.S.C. 154(b) by 0 days.

(21) Appl. No.: 14/340,689

(22) Filed: Jul. 25, 2014

(65) Prior Publication Data

US 2016/0025166 A1    Jan. 28, 2016

(51) Int. Cl.
*F16D 65/12* (2006.01)
*F16D 65/02* (2006.01)

(52) U.S. Cl.
CPC ...... *F16D 65/123* (2013.01); *F16D 2065/1368* (2013.01); *F16D 2065/1392* (2013.01); *F16D 2250/0084* (2013.01)

(58) Field of Classification Search
CPC ................ F16D 65/123; F16D 65/128; F16D 2065/1356; F16D 2065/1376; F16D 2065/1384; F16D 2065/1392; F16D 2065/1368
See application file for complete search history.

(56) References Cited

U.S. PATENT DOCUMENTS

| | | | |
|---|---|---|---|
| 6,626,273 | B1 | 9/2003 | Baumgartner et al. |
| 6,997,292 | B2 | 2/2006 | Burgoon et al. |
| 7,410,036 | B2 | 8/2008 | Wimmer et al. |
| 8,651,247 | B2 | 2/2014 | Burgoon et al. |
| 2003/0006104 | A1 | 1/2003 | Baumgartner et al. |
| 2003/0066715 | A1 | 4/2003 | Baumgartner et al. |
| 2004/0140164 | A1* | 7/2004 | Burgoon et al. .......... 188/218 R |
| 2004/0178030 | A1 | 9/2004 | Pacchiana et al. |
| 2007/0193837 | A1* | 8/2007 | Lamb ...................... 188/218 XL |
| 2010/0258394 | A1 | 10/2010 | Hanna et al. |
| 2012/0085603 | A1 | 4/2012 | Mayer et al. |
| 2012/0137485 | A1 | 6/2012 | Ricci |
| 2013/0001029 | A1 | 1/2013 | Visca et al. |

FOREIGN PATENT DOCUMENTS

| | | |
|---|---|---|
| DE | 10025102 C1 * | 9/2001 |
| EP | 1375953 A2 * | 1/2004 |

(Continued)

OTHER PUBLICATIONS

International Search Report (PCT/ISA/220 & PCT/ISA/210) issued in PCT Application No. PCT/US2015/042000 dated Oct. 20, 2015 (Three (3) pages).

(Continued)

*Primary Examiner* — Anna Momper
(74) *Attorney, Agent, or Firm* — Crowell & Moring LLP

(57) ABSTRACT

A disc brake for a vehicle axle includes a brake rotor, a brake caliper that straddles the brake rotor, a wheel hub, and a plurality of brake rotor mounting elements that couple the brake rotor to the wheel hub. The brake rotor includes a friction ring portion and a rotor mounting portion radially inward of the friction ring portion. The rotor mounting portion is formed on a radially inner circumference of the brake rotor, and includes a plurality of splines extending radially inward toward an axis of rotation of the brake rotor and a radially inward extending axial motion limiting feature disposed between each adjacent pair of the plurality of splines.

20 Claims, 13 Drawing Sheets

(56) References Cited

FOREIGN PATENT DOCUMENTS

| EP | 2639472 | A1 | * | 9/2013 |
| WO | WO 0201088 | A1 | * | 1/2002 |
| WO | WO 02101259 | A1 | * | 12/2002 |
| WO | WO 2006108080 | A2 | * | 10/2006 |

OTHER PUBLICATIONS

Written Opinion (PCT/ISA/237) issued in PCT Application No. PCT/US2015/042000 dated Oct. 20, 2015 (Five (5) pages).

* cited by examiner

BRAKE DISC AND MOUNTING ARRANGEMENT FOR A BRAKE DISC

BACKGROUND

The present invention relates to disc brakes for vehicles, and in particular to an arrangement for connecting a brake disc to an axle hub, including axle hubs utilized on commercial vehicles, such as tractor-trailer trucks, box trucks, buses, and the like.

Disc brakes are increasingly being used on commercial vehicles, replacing conventional drum brakes. Due to the very high braking forces (aka braking loads) generated when the disc brake's caliper applies the brake pads to the brake disc to slow such heavy vehicles, very robust and often complicated designs have been required to connect the brake disc to the axle hub to transfer the braking forces from the brake disc to the axle hub on which the brake disc is mounted. The design of the brake disc-to-hub connection is further complicated by the heat generated during braking as the kinetic energy of the vehicle is converted into heat energy by application of the brake pads to the brake disc. This heat can be detrimental to the axle hub and its components (such as bearings and seals), as well as to other adjacent components that may receive heat from the axle hub as the hub receives and dissipates the heat received from the brake disc.

Commercial vehicle brake discs, also referred to as "brake rotors" or "rotors," often are mounted onto axle hubs using so-called spline arrangements using a fixed or floating connection, such as taught in U.S. Pat. Nos. 6,626,273 and 7,410,036. One example is the Splined Disc® brake assembly from Bendix Spicer Foundation Brake LLC. These types of brakes typically are mounted on an axle hub having a plurality of axially-oriented splines arranged around an outer circumference of a disc-mounting region of the hub. The splined disc has corresponding radially-inward facing tabs about the inner circumference of the hub mounting portion of the brake disc. The disc is typically mounted to the axle hub by axially sliding the brake disc onto the hub's mating splines, followed by insertion and/or attachment of a variety of fasteners, brackets, etc., as necessary per the particular splined disc's design in order to secure the brake disc against axial movement off of the hub. When so mounted, the brake disc tabs engage the hub splines in a manner which permits the very large braking forces generated by the disc brake to be transferred to the axle hub and hence to the axle to slow the vehicle. This often requires costly precision machining of the spline/tab engagement surfaces to ensure satisfactory transfer of braking loads in the circumferential direction over the life of the brake disc.

Splined discs typically have had substantial metal-to-metal contact between the inner radial tabs of the brake disc and either the faces of the axle hub splines or intermediary inserts that are used to transfer the braking loads from the disc tabs to the hub splines. The intermediate inserts are used in conjunction with hub axial rotor stop to axially restrain the brake disc on the axle hub. This metal-to-metal contact has the disadvantage of facilitating transfer of a large amount of brake heat from the brake disc directly to the axle hub. This is a particular problem where the axle hub is formed from Aluminum, a material which is being more frequently used for axle hubs in order to minimize vehicle weight and improve fuel economy.

Further, where intermediary disc-to-hub elements are used to locate and transfer brake forces, these typically stainless steel elements add to manufacturing costs, add complication to installation techniques, and are subjected to braking force loads that are high enough to approach the material's durability limits. The excessive heat transferred to the intermediary elements can also raise the temperatures of these elements to a point that long-term strength and fatigue life may be adversely affected.

SUMMARY OF THE INVENTION

In order to address these and other problems with brake disc mounting in the prior art, the present invention provides a disc mounting arrangement that minimizes heat transfer from the brake disc to the axle hub, eliminates the need for a large number of individual intermediary disc-to-hub elements, simplifies installation and replacement of the brake disc, and is highly cost effective.

In one embodiment of the invention, a disc brake includes a brake caliper configured to straddle the brake rotor when in an operative position on the vehicle axle wheel hub, and a plurality of brake rotor mounting elements configured to couple the brake rotor to the wheel hub and to transfer a torque from the wheel hub to the brake rotor. The brake rotor includes a friction ring portion and a rotor mounting portion radially inward of the friction ring portion. The rotor mounting portion may be formed on a radially inner circumference of the brake rotor, and may include a plurality of splines extending radially inward toward an axis of rotation of the brake rotor and a radially inward extending axial motion limiting feature disposed between each adjacent pair of the plurality of splines.

This arrangement allows the brake rotor to be thermally decoupled from the wheel hub by substantially eliminating metal-to metal contact between the brake rotor and the wheel hub, thereby providing a thermal break between all points of contact of the brake rotor and wheel hub. The arrangement also eliminates the need for the previously known highly stressed Aluminum axial rotor stop elements.

In another embodiment of the invention, the rotor mounting portion of the brake rotor may include a radially inward extending axial motion limiting feature disposed between each adjacent pair of the plurality of splines configured to cooperate with the plurality of brake rotor mounting elements to limit axial motion of the rotor on the wheel hub. Preferably, at least the axial face of the motion limiting features is recessed below the axial face of the rotor mounting portion to accommodate a rotor mounting element. Such an arrangement permits the mounting element to be essentially flush with the rotor mounting face when installed.

In a further embodiment of the invention, a vehicle axle includes a wheel hub, an axle shaft that transfers a motive force to the wheel hub, a brake rotor, a plurality of brake rotor mounting elements configured to mount the brake rotor to the wheel hub, and a brake caliper configured to straddle the brake rotor when in an operative position on the vehicle axle. The brake rotor includes a friction ring portion and a rotor mounting portion radially inward of the friction ring portion. The rotor mounting portion on an inner circumference includes a plurality of splines extending radially inward toward an axis of rotation of the brake rotor and a radially inward extending axial motion limiting feature disposed between each adjacent pair of the plurality of splines. The plurality of brake rotor mounting elements includes a plurality of mounting plates, a plurality of bushings, and a plurality of mounting fasteners. Each of the plurality of mounting plates has at least two projections, and each adjacent pair of the at least two mounting plate projections is arranged to straddle an associated one of the plurality of splines in a circumferential direction. In addition to mounting plates being located at an outboard side of the brake rotor, mounting plates may be located at an inboard side of the brake rotor. The plurality of fasteners are configured to secure the plurality of mounting plates to a wheel hub of the vehicle axle. The axial motion limiting features of the brake rotor are captured between the outboard mounting plates of the plurality of mounting plates and at least one of the inboard mounting plates and the wheel hub of the vehicle axle.

Other objects, advantages and novel features of the present invention will become apparent from the following detailed description of the invention when considered in conjunction with the following accompanying drawings.

Common reference label numbers are used with common features in the figures.

DETAILED DESCRIPTION OF THE DRAWINGS

Figure 1:
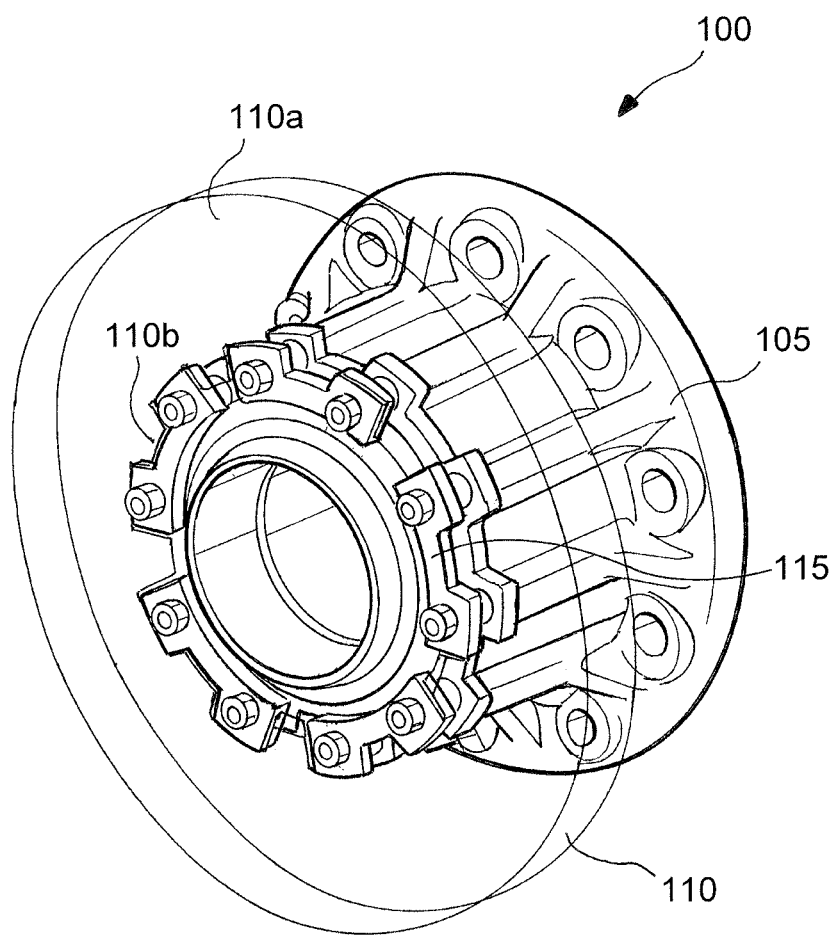
FIG. 1 is a perspective view of a brake system in accordance with an embodiment of the present invention.
Figure 2:
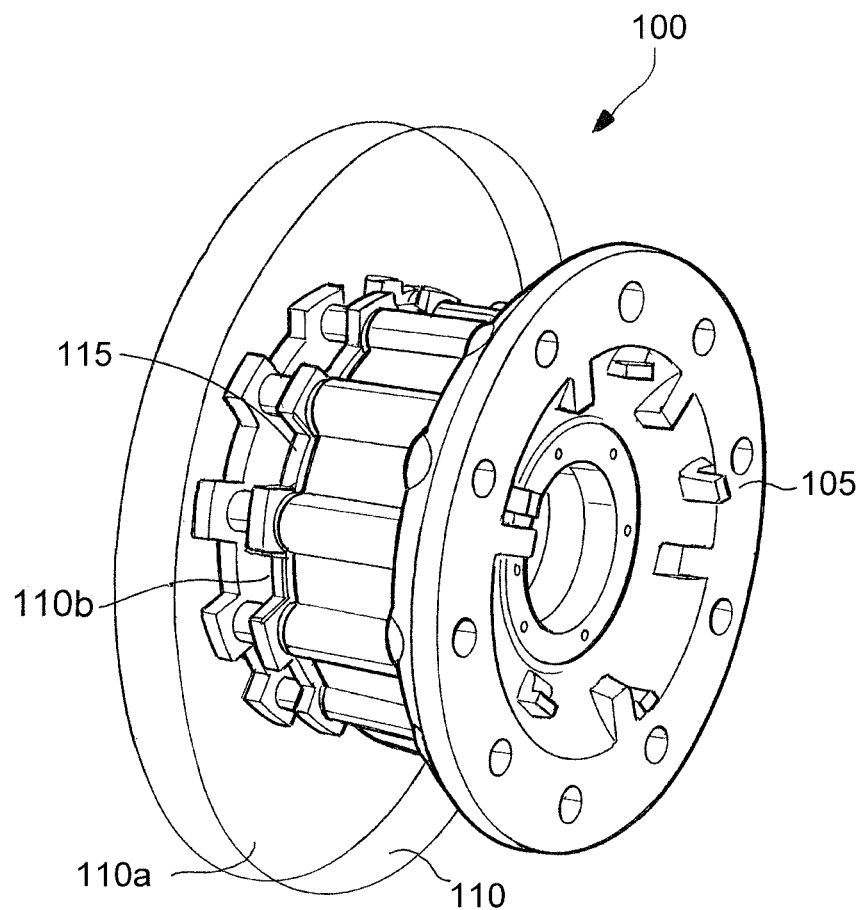
FIG. 2 is another perspective view of the brake system depicted in FIG. 1.

FIGS. 1 and 2 illustrate a disc brake system 100 according to an embodiment of the present invention. The disc brake system 100 includes a wheel hub 105 that is coupled to an axle.

Figure 12:
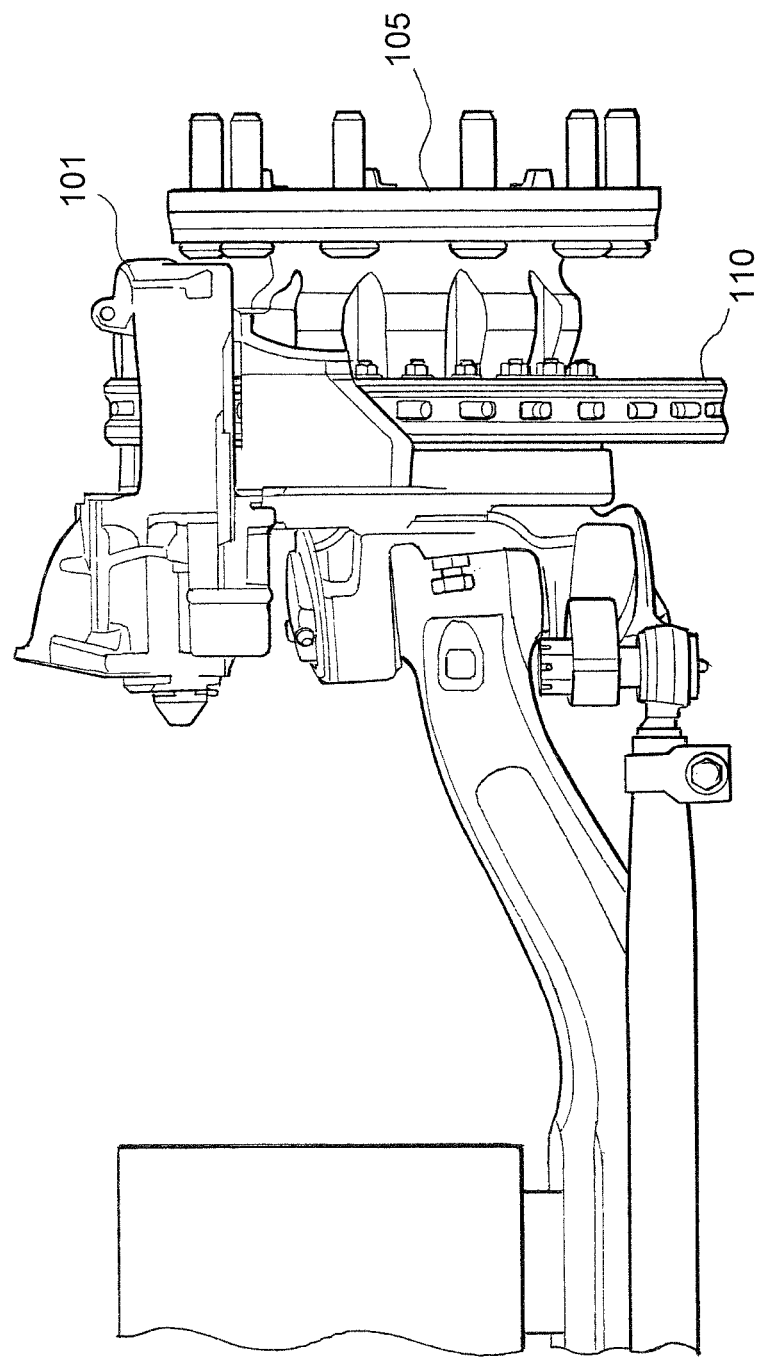
FIG. 12 is a side view of an arrangement in accordance with an embodiment of the present invention.

The brake rotor 110 includes a friction ring portion 110a and a rotor mounting portion 110b that is radially inward of the friction ring portion 110a. The brake rotor mounting portion 110b is coupled to the wheel hub 105 via a plurality of brake rotor mounting elements 115. A brake caliper 101, such as the one shown in FIG. 12, straddles the brake rotor 110 when in an operative position on the brake axle. In one embodiment, the brake caliper 101 straddles the friction ring portion 110a of brake rotor 110. In alternate embodiments, however, the brake caliper may straddle both the friction ring portion 110a and at least a section of the rotor mounting portion 110b.

Figure 3:
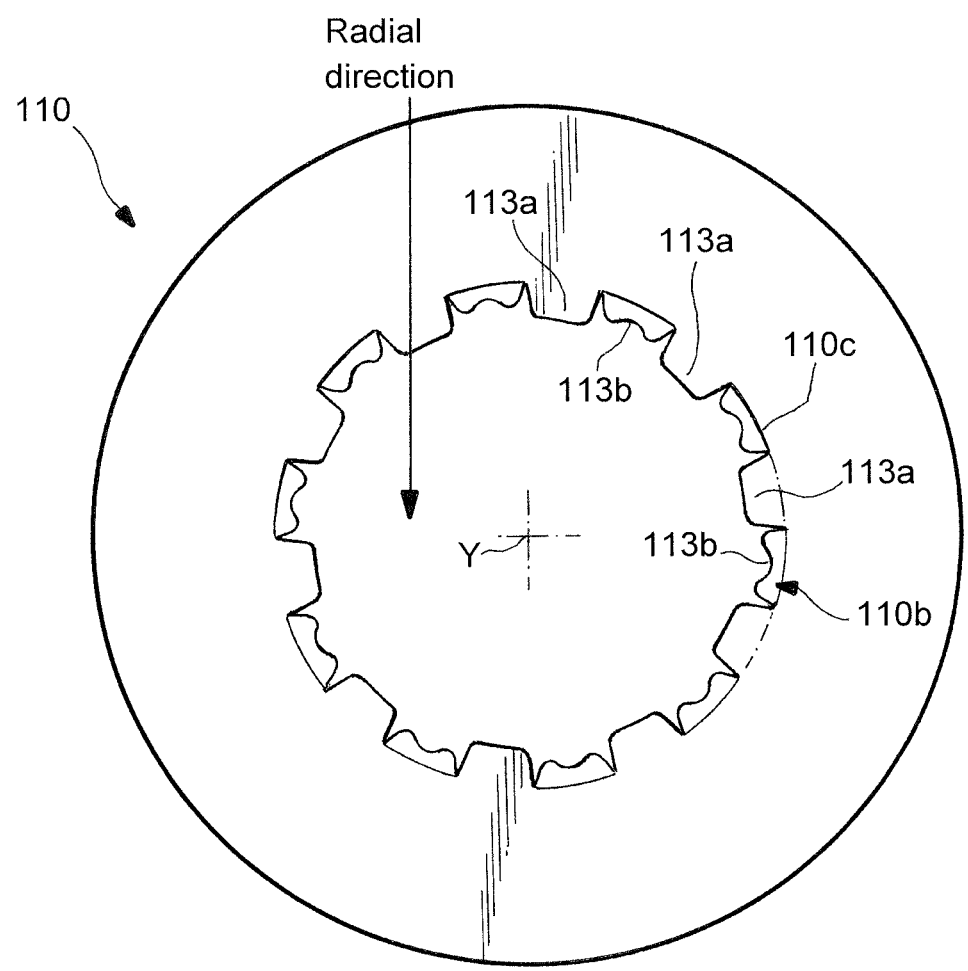
FIG. 3 is a plan view of a brake rotor in accordance with an embodiment of the present invention.
Figure 4:
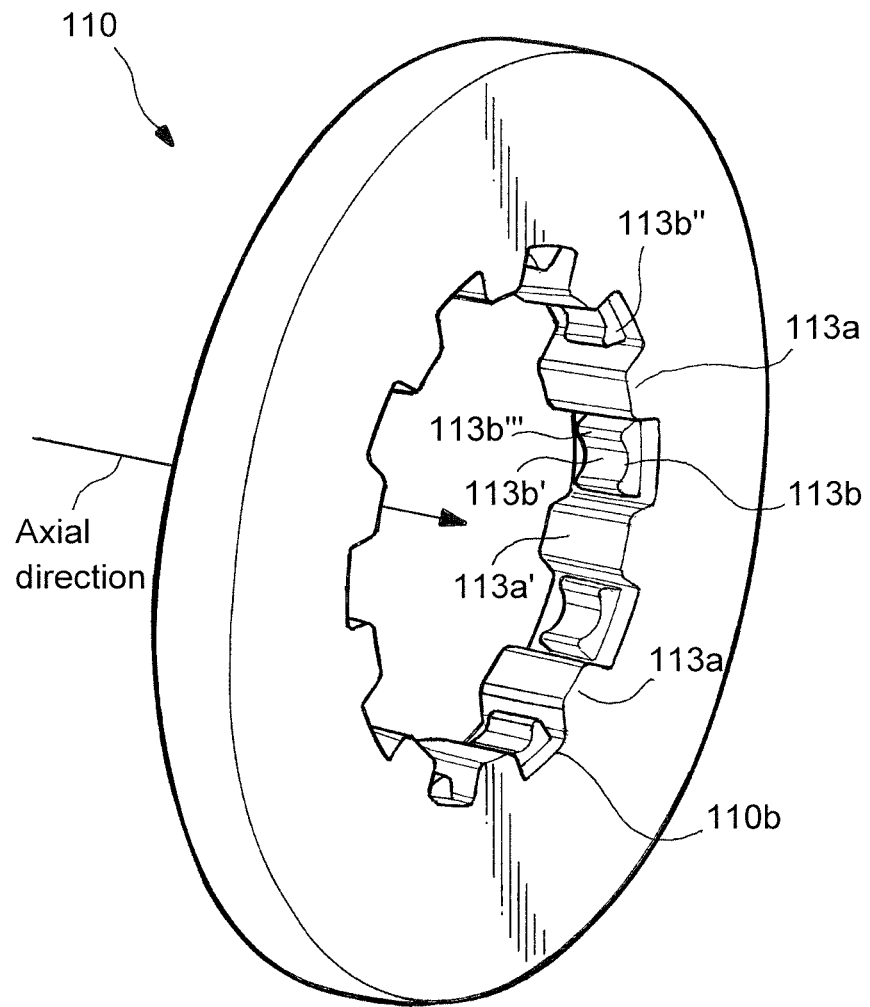
FIG. 4 is a perspective view of the brake rotor depicted in FIG. 3.

As shown in FIGS. 3 and 4, the rotor mounting portion 110b of brake rotor 110 is formed in a radially inner circumference 110c of the brake rotor 110. The rotor mounting portion 110b includes a plurality of splines 113a that extend radially inward toward an axis of rotation Y of the brake rotor 110 and that limit the rotational torque exerted on the disc brake. Further, as shown in FIG. 3, the brake rotor 110 includes a radially inward extending axial motion limiting feature 113b disposed between each adjacent pair of the plurality of splines 113a. The axial motion limiting feature 113b prevents out of plane bending, such as any wobbling of the disc brake. Moreover, in this embodiment, the splines 113a may extend radially inward toward the axis of rotation of the brake rotor 110, such that the splines 113a reach closer to the axis of rotation Y than each motion limiting feature 113b. The disc brake system 100, however, need not be limited to such configuration. For instance, in other embodiments, the splines 113a and motion limiting feature 113b may be equidistant to the axis of rotation Y and/or extend closer to the axis of rotation Y than the splines 113a. Unlike existing disc brakes, in which hub splines are configured to both limit rotational torque and to prevent out of plane bending, in the inventive disc brake in accordance with this embodiment different structural features address each of these issues.

Figure 8:
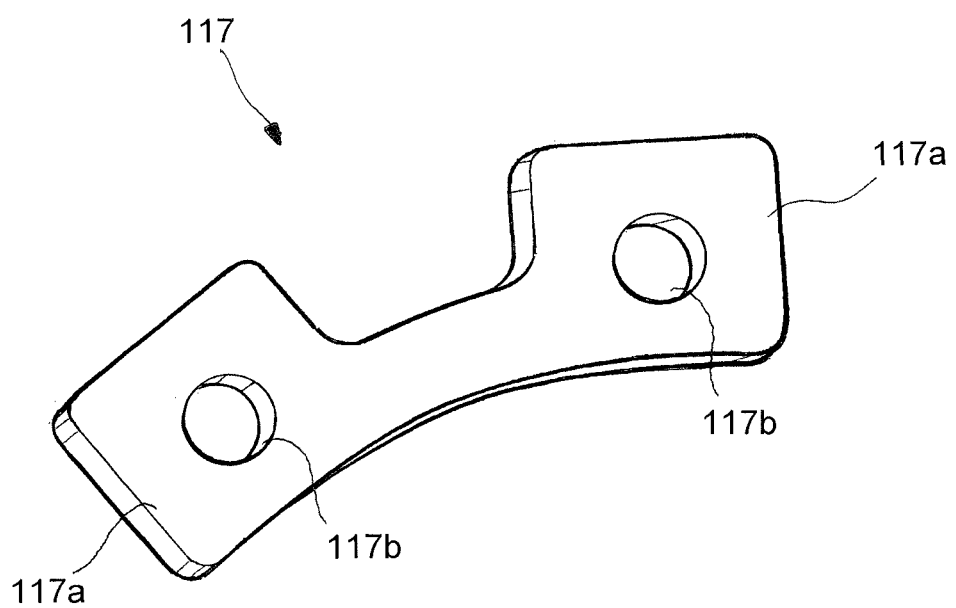
FIG. 8 is a plan view of a mounting plate in accordance with an embodiment of the present invention.

In FIGS. 5-8, the plurality of brake rotor mounting elements 115 include a plurality of mounting plates 117 and a plurality of mounting fasteners 119 that secure the plurality of mounting plates 117 to the wheel hub 105 of the vehicle axle. As shown in FIG. 8, each mounting plate 117 has at least two projections 117a. The projections 117a extend from opposite ends of each mounting plate 117 and include openings 117b formed therethrough. The openings 117b are configured to accommodate passage therethrough of fasteners 119, which may be a bolt, or any other fastening mechanism known to those of ordinary skill in the art. Moreover, as shown in FIG. 8, each mounting plate 117 may have a substantially elongated u-shape. Further, each mounting plate 117 may be substantially curved along its length. Moreover, the two projections 117a may be substantially rectangular in shape. The two projections 117a, however, need not be limited to the illustrated shape, as long as they cooperate with the brake rotor to limit circumferential and axial motion of the brake rotor 110 relative to the wheel hub 105.

Figure 4A:
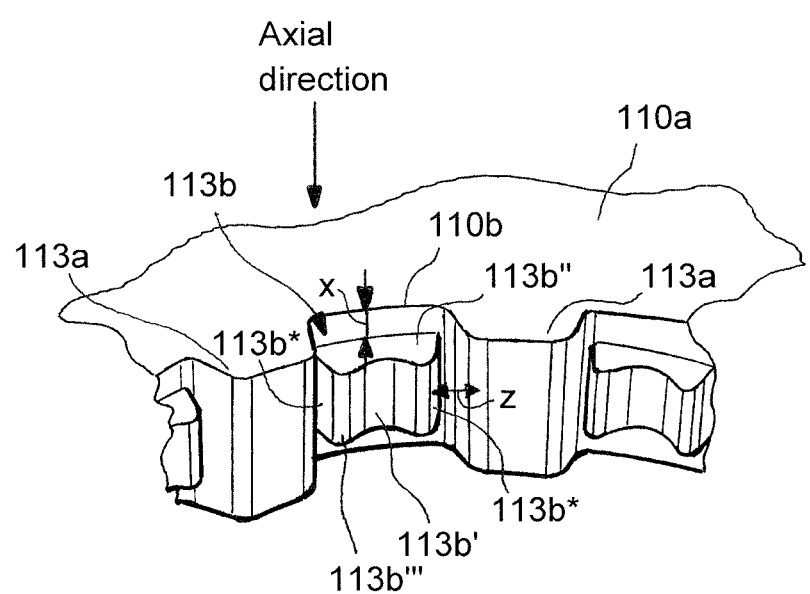
FIG. 4a is a perspective view of a portion of the brake rotor depicted in FIG. 4.
Figure 5:
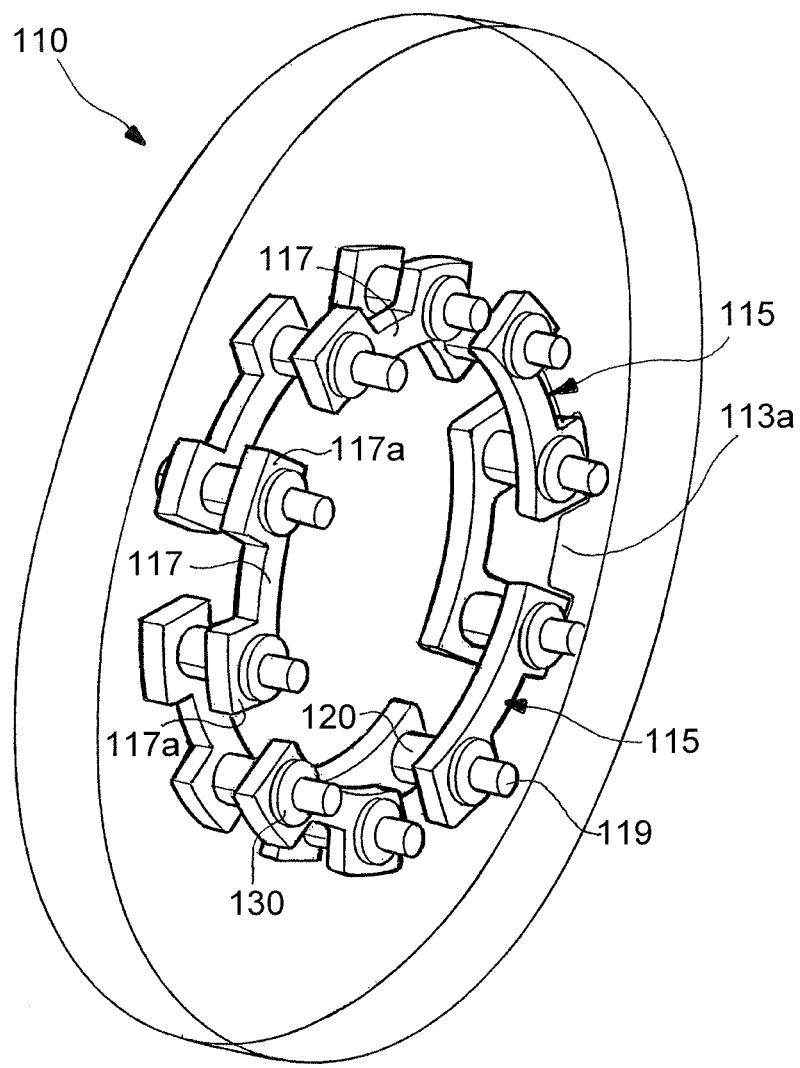
FIG. 5 is a perspective view from in inboard side of a brake rotor and brake rotor mounting elements in accordance with an embodiment of the present invention.

As shown in FIG. 5, each adjacent pair of the at least two mounting plate projections 117a is arranged to straddle an associated one of the plurality of splines 113a in a circumferential direction of the brake rotor 110. In this configuration, a given spline 113a may be accommodated between the two projections 117a of a single mounting plate 117. Further, as shown in FIG. 5, the plurality of mounting plates 117 may be located on an outboard side "O" and an inboard side "I" of the brake rotor 110. In this embodiment, the axial motion limiting features 113b (illustrated in greater detail in FIG. 4a discussed below) are recessed. The mounting plates 117 located on both the outboard side O and inboard side I of the brake rotor 110 are flush with both the outboard and inboard sides of the brake rotor 110, such that the thickness of the brake rotor mounting arrangement substantially corresponds to the thickness of the brake rotor 110.

The axial motion limiting feature 113a of the brake rotor 110 shown in FIGS. 4 and 4a is an abutment that is located between the outboard mounting plates of the plurality of mounting plates 117 and at least one of the inboard mounting plates of the plurality of mounting plates and the wheel hub 105 of the vehicle axle. The abutment 113b includes a surface (abutment surface) 113b' configured to cooperate with one of the mounting fasteners 119 and on bushings 120 carried on the fasteners 119 to limit circumferential motion of the brake rotor 110 relative to the wheel hub 105 of the vehicle axle.

As shown in FIG. 4a, each motion limiting feature 113b, along an axial direction of the brake rotor 110 may be axially separated from the rotor mounting portion 110b by a distance "X." In some embodiments, such as the embodiment of FIG. 5, the distance X may be substantially equal to a thickness of each mounting plate 117. The inventive brake rotor 110, however, need not be limited to such configuration and in other embodiments the distance X may be greater than, or smaller than the thickness of each mounting plate 117. Further, each motion limiting feature 113b may include two lateral surfaces 113b* that respectively face and are the closest surfaces on the motion limiting feature 113b to adjacent splines 113a, and each lateral surface 113b* may be separated from an adjacent spline 113a by a distance "Z." Moreover, as shown in FIG. 3, distance Z may increase or gradually increase along the radial direction of the brake rotor 110 toward the center thereof.

The abutment surface 113b' of the abutment 113b may have any desired shape, as long as it provides a surface that cooperates with a mounting plate and/or wheel hub to limit axial motion of the brake rotor. For instance, as shown in FIG. 3, the abutment surface 113b' may have a substantially semicircular or concave shape. However, the abutment surface 113b' need not be limited to such shape. For instance, in other embodiments the abutment surface 113b' may have any desired polygonal shape as may occur to those of ordinary skill in the art, so long as the shape of abutment surface 113b' is able to cooperate with one of the mounting fasteners 119 and a bushing 120 to limit circumferential motion of the brake rotor 110 relative to the wheel hub 105 of the vehicle axle.

Figure 6:
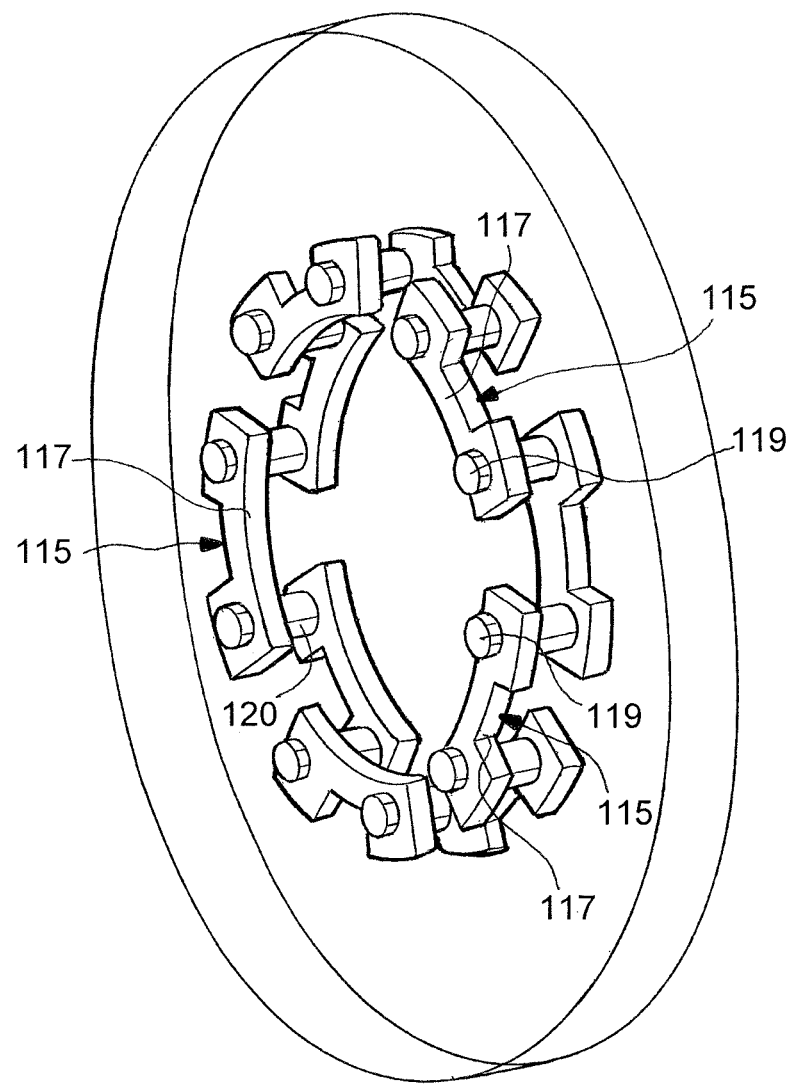
FIG. 6 is a perspective view from an outboard side of the brake rotor and brake rotor mounting elements depicted in FIG. 5.
Figure 7:
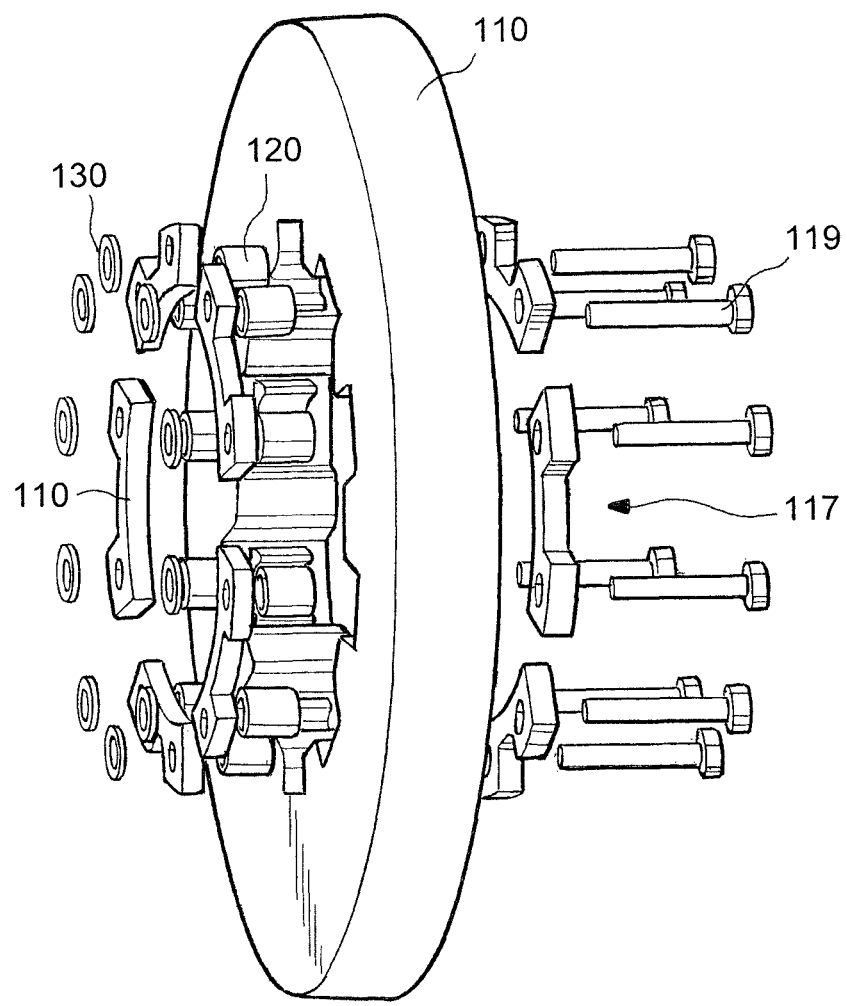
FIG. 7 is an exploded view of the brake rotor and brake rotor mounting elements depicted in FIG. 5 and FIG. 6.

As shown in FIG. 6, the plurality of mounting plates 117 may be mounted in the rotor mounting portion 110b such that the mounting plates 117 are substantially flush with the friction ring surfaces 110a. Further, the plurality of mounting plates 117 may be disposed on both outboard and inboard portions of the brake rotor 110. Alternatively, the plurality of mounting plates 117 may be disposed only on an outboard portion of the brake rotor 110. In such embodiment, for example, the abutment 113b may be flush with an inboard portion of the brake rotor 110, permitting direct abutment-to-wheel hub contact, or use of inboard mounting plates as hub-to-disc axial spacers.

Figure 9:
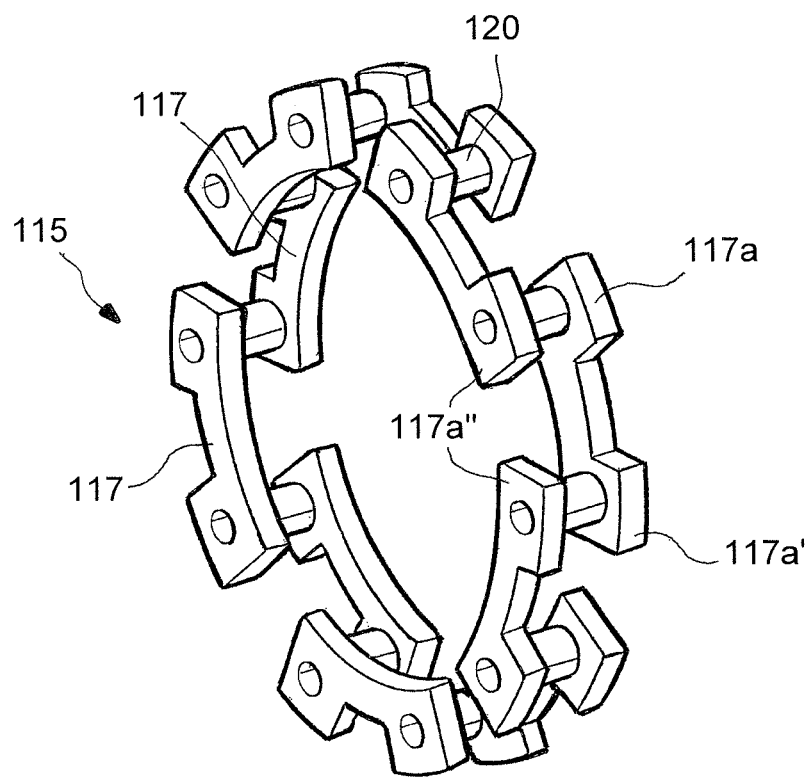
FIG. 9 is a perspective view of a plurality of mounting plates depicted in FIG. 8.

As shown in FIGS. 5, 6, and 9 the plurality of mounting plates 117 may be staggered in a circumferential direction of the brake rotor 110. As shown in FIG. 9, this staggered arrangement may arise from the projections 117a of each mounting plate 117 being coupled to a projection 117a of a different mounting plate 117 with a bushing 120 interposed between each of the projections 117a.

The inventive brake rotor mounting arrangement may include a spring loaded member 130 that is interposed between the plurality of mounting plates 117 and the wheel hub 105, so as to bias the brake rotor 110 in a desired direction and/or provide an axially resilient rotor mount that minimizes noise generation. The spring loaded member 130 may be a washer having a substantially conical shape. The spring loaded member 130, however, need not be limited to such configuration, and in other embodiments, the spring loaded member 130 may have any desired shape, and in fact may be replaced with any existing spring loaded member, including, for example, a spring lock washer, toothed lock washer, abrasive type lock washer, or any other type of spring loaded washer as may occur to those of ordinary skill in the art. With this arrangement, there is a preload in compression on the mounting plates, and when the mounting fasteners are tightened, the loaded mounting plates compensate for tolerances between the components.

The configuration of openings 117b may vary. For instance, in some embodiments, such as the one shown in FIG. 8, the openings 117b may have a substantially consistent diameter. In this embodiment, the head of fastener 119 may protrude from mounting plate 117. The openings 117b, however, need not be limited to such configuration and in other embodiments may be counter sunk, such that the heads of fasteners 119 are substantially flush with a surface of the mounting plates 117. The mounting fasteners 119 also may be alternatively configured as long as they secure the mounting plates 117 (and thereby the brake rotor 110) to the wheel hub 105. For example, bolts with a head that screws into the wheel hub 105 may be replaced by headless studs installed into the axial bores if the wheel hub, with the mounting plates being axially retained on the studs with another fastening component such as a nut on each stud.

The mounting plates 117 may be distributed around the inner circumference of the rotor mounting portion 110b with at least one spline 113b between each pair of adjacent mounting plates 117 that is not straddled by a mounting plate 117. For example, as shown in FIG. 5, on the outboard side of the brake rotor 110, in a clockwise direction of the rotor mounting portion 110b, the splines 113a alternate between a configuration in which a spline 113b is straddled by a pair of adjacent projections 117a of two different mounting plates 117, while the spline 113a that is immediately adjacent along the clockwise direction is straddled by a pair of projections 117a of the same mounting plate 117. Further, as shown in FIG. 5, on the inboard side of the brake rotor, the same spline 113a that is straddled by a pair of adjacent projections 117a of two different mounting plates 117 is straddled by a pair of projections 117a of the same mounting plate 117.

Figure 10:
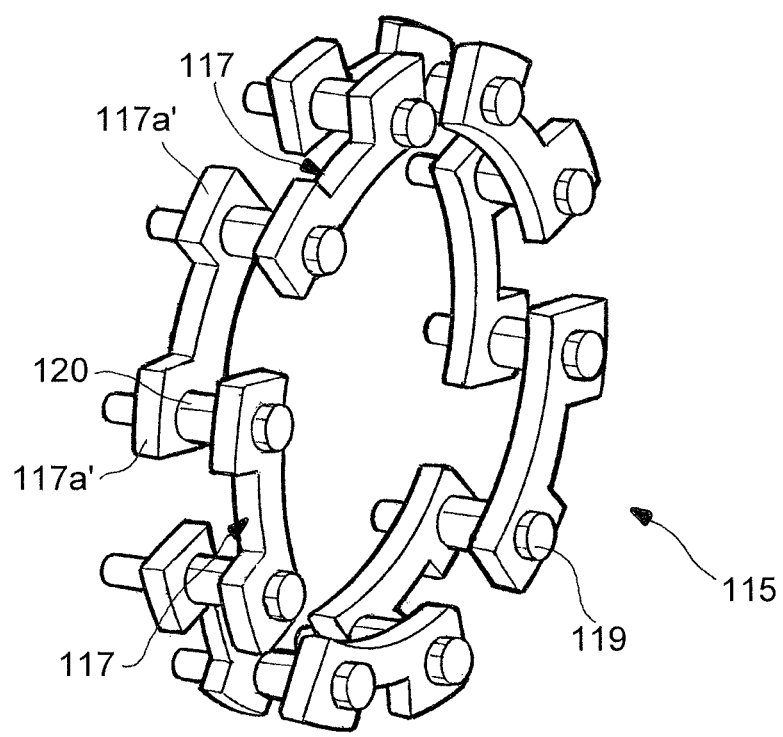
FIG. 10 is perspective view from the outboard side of the plurality of mounting plates depicted in FIG. 9 with a plurality of fasteners.

This staggered arrangement is further illustrated in FIGS. 9 and 10, where for illustrative purposes, the projections of one mounting plate 117 have been labeled 117a', whereas the adjacent projections of two different mounting plates 117 have been labeled 117a". Thus, as can be seen in FIGS. 9 and 10, a given spline 113a that is straddled by the pair of adjacent projections of two different mounting plates 117a", is straddled on the opposite side by a pair of projections of one mounting plate 117a'.

Figure 11:
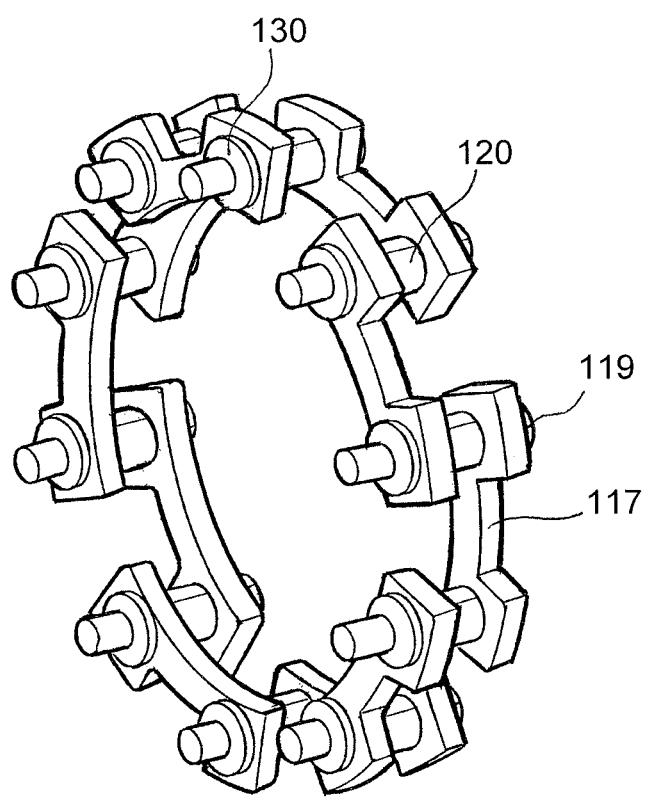
FIG. 11 is another perspective view from the inboard side of the plurality of mounting plates and plurality of fasteners depicted in FIG. 10.

As shown in FIG. 10, a bushing 120 may be used to axially separate a projection 117a" from a projection 117a' on the opposite side. Further, as shown in FIG. 11, a fastener 119 may be inserted through the opening 117b of each projection 117a and through the bushing 120 to thereby fasten the plurality of brake rotor mounting elements 115 to the wheel hub 105, with the bushing providing increased load-bearing surface area for a transfer of braking loads from the axial motion limiting feature 113b to the wheel hub 105. Further, as shown in FIGS. 10 and 11, due to the elongated curved shape of each mounting plate 117, the plurality of brake rotor mounting elements 115 may be coupled together into a pair of concentric rings that are axially separated by a plurality of bushings 120.

The present invention thus provides a brake rotor-to-hub mounting arrangement that is sufficiently strong and durable to reliably transfer braking forces to the wheel axle, while substantially reducing the amount of heat transfer from the brake rotor to the wheel hub by effectively isolating the wheel axle from direct contact with the brake rotor. Further, the contact points between the brake rotor, the brake rotor mounting elements, and wheel hub is limited and discontinuous. For instance, in the illustrated embodiments only surfaces on the axial motion limiting feature 113b come in direct contact with the brake rotor mounting elements 115, i.e. abutment surface 113b' contacts only bushing 120, while only a portion of each projection 117a contacts inner and outer ends 113b" and 113b''' of each axial motion limiting feature 113b. The rest of the brake rotor mounting elements 115 do not contact the brake rotor 110, further minimizing heat transfer from the brake rotor 110 to the wheel hub 105.

Further, the inventive brake system is well suited for installation and exchange in the field by technicians, requiring removal of fewer fasteners and providing easy alignment of the brake rotor, splines, mounting elements and bushing blocks during reassembly, as well as only requiring replacement of the brake rotor itself, thereby reducing maintenance part and labor costs and minimizing vehicle down time.

As shown in FIG. 3, the invention also provides a brake rotor 110 comprising a friction ring portion 110a and a rotor mounting portion 110b radially inward of the friction ring portion 110a. The rotor mounting portion 110b may be located on an inner circumference 110c of the brake rotor 110 and may include a plurality of splines 113a that extend radially inward toward an axis of rotation Y of the brake rotor 110 and a radially inward extending axial motion limiting feature 113b disposed between each adjacent pair of the plurality of splines 113a.

As shown in FIG. 4, along an axial direction of the brake rotor 110, a thickness of the splines 113a is greater than a thickness of the axial motion limiting features 113b. The inventive brake rotor 110, however, need not be limited to such configuration, and may alternatively be configured such that along the axial direction of the brake rotor 110 the thickness of the splines 113a is equal to the thickness of each axial motion limiting feature 113b. Alternatively, the thickness of the axial motion limiting feature 113b may be greater than the thickness of the splines 113a, along the axial direction of the brake rotor 110.

The radial length of the splines 113a and each axial motion limiting feature 113b may be different. For instance, as shown in FIG. 3, along a radial direction of the brake rotor 110, the plurality of splines 113a may extend closer to the center of the brake rotor 110 than each motion limiting feature 113b. The inventive brake rotor, however, need not be limited to such configuration. For instance, in alternate embodiments the radial length of the splines 113a and each axial motion limiting feature 113b may be the same. Alternatively, in other embodiments the radial length of each axial motion limiting feature 113b may be longer than the radial length of the splines 113a.

The shape of end surfaces of the splines 113a' and the shape of end surfaces of each axial motion limiting feature 113b' may vary. For example, in one embodiment, the end surfaces of each spline 113a' along a radial direction of the brake rotor 110 may have a shape that is complimentary to end surfaces of each motion limiting feature 113b' along the radial direction of the brake rotor 110. Alternatively, the shape of end surfaces of the splines 113a' and each axial motion limiting feature 113b' may be different, and may in fact have any polygonal shape as may occur to those of ordinary skill in the art.

The foregoing disclosure has been set forth merely to illustrate the invention and is not intended to be limiting. Because other such modifications of the disclosed embodiments incorporating the spirit and substance of the invention may occur to persons of ordinary skill in the art, the invention should be construed to include everything within the scope of the appended claims and equivalents thereof.

LISTING Of REFERENCE LABELS 100 disc brake system
101 brake caliper
105 wheel hub
110 brake rotor
110a brake rotor friction ring
110b brake rotor mounting portion
110c radially inner circumference
113a spline
113a' end surface of spline
113b axial motion limiting feature
113b' abutment surface of axial motion limiting feature
113b" inner end of axial motion limiting feature
113b''' outer end of axial motion limiting feature
113b* lateral surfaces of axial motion limiting feature
115 brake rotor mounting element
117 mounting plate
117a mounting plate projection
117a' mounting plate projections in the same mounting plate
117a" mounting plate projection in adjacent, different mounting plates
117b mounting plate opening
119 mounting fastener
120 bushing
130 spring loaded member

What is claimed is:

1. A disc brake comprising:
a brake rotor; and
a plurality of brake rotor mounting elements configured to couple the brake rotor to a wheel hub of a vehicle, wherein
the brake rotor includes a friction ring portion and a rotor mounting portion radially inward of the friction ring portion, and
the rotor mounting portion, formed on a radially inner circumference of the brake rotor, includes a plurality of splines extending radially inward toward an axis of rotation of the brake rotor and a radially inward extending axial motion limiting feature disposed between each adjacent pair of the plurality of splines, wherein
the splines extend radially inward closer to an axis of rotation of the brake rotor than each axial motion limiting feature,
the plurality of brake rotor mounting elements includes a plurality of mounting plates and a plurality of mounting fasteners that secure the plurality of mounting plates to a wheel hub of the vehicle axle,
each of the plurality of mounting plates has at least two projections,
each adjacent pair of the at least two mounting plate projections is arranged to straddle an associated one of the plurality of splines in a circumferential direction and cooperate with the axial motion limiting feature to limit axial motion of the brake rotor relative to the wheel hub,
the plurality of mounting plates are located on an outboard side of the brake rotor and on an inboard side of the brake rotor,
the axial motion limiting feature located between the outboard mounting plates of the plurality of mounting plates and the wheel hub,
the axial motion limiting feature is an abutment, and
the abutment includes a surface configured to cooperate with at least one of the mounting fasteners and bushings carried on the mounting fasteners to limit circumferential motion of the brake rotor relative to the associated wheel hub of the vehicle axle.

2. The disc brake according to claim 1, wherein the abutment is located between the outboard and inboard mounting plates.

3. The disc brake according to claim 1, wherein the plurality of mounting plates are substantially flush with at least one of the inboard and outboard friction ring surfaces.

4. The disc brake according to claim 1, wherein the abutment is substantially flush with an inboard portion of the brake rotor and axially recessed from the outboard portion of the brake rotor.

5. The disc brake according to claim 1, wherein the plurality of mounting plates are staggered in a circumferential direction of the brake rotor.

6. The disc brake according to claim 1, further comprising a spring loaded member interposed between the plurality of mounting plates and the wheel hub, wherein the spring loaded member has a truncated conical shape.

7. The disc brake according to claim 6, wherein heads of the fastening members are substantially flush with a surface of the plurality of mounting plates.

8. The disc brake according to claim 1, wherein the mounting plates on at least one side of the brake rotor are distributed around the inner circumference of the rotor mounting portion with at least one spline between each pair of adjacent mounting plates not straddled by a mounting plate.

9. A brake rotor comprising:
a friction ring portion; and
a rotor mounting portion radially inward of the friction ring portion, wherein
the rotor mounting portion on an inner circumference of the brake rotor includes a plurality of splines extending radially inward toward an axis of rotation of the brake rotor and a radially inward extending axial motion limiting feature that is disposed between each adjacent pair of the plurality of splines, and
the radially inward extending axial motion limiting feature includes a surface configured to cooperate with at least one of a plurality of mounting fasteners and a bushing carried on the at least one mounting fastener to limit circumferential motion of the brake rotor relative to a wheel hub of a vehicle axle.

10. The brake rotor according to claim 9, wherein along an axial direction of the brake rotor, a thickness of the plurality of splines is greater than a thickness of the radially inward extending axial motion limiting feature.

11. The brake rotor according to claim 9, wherein along a radial direction of the brake rotor, the plurality of splines extend closer to an axis of rotation of the brake rotor than the radially inward extending axial motion limiting feature.

12. The brake rotor according to claim 9, wherein end surfaces of each spline along a radial direction of the brake rotor have a shape that is complimentary to end surfaces of each of the radially inward extending axial motion limiting feature along the radial direction of the brake rotor.

13. The brake rotor according to claim 9, wherein the radially inward extending axial motion limiting feature along an axial direction of the brake rotor separated from the rotor mounting portion.

14. The brake rotor according to claim 9, wherein the radially inward extending axial motion limiting feature includes two lateral surfaces that respectively face and are the closest surfaces on the radially inward extending axial motion limiting feature to adjacent splines, and each lateral surface is separated from an adjacent spline.

15. The brake rotor according to claim 14, wherein two lateral surfaces of the radially inward extending axial motion limiting feature tapers inward along the radial direction of the brake rotor toward an axis of rotation of the brake rotor.

16. A method of assembling a disc brake, the disc brake including a brake rotor, a plurality of mounting plates and a plurality of mounting fasteners, the plurality of mounting plates and the plurality of mounting fasteners being configured to cooperate to couple the brake rotor to a wheel hub of a vehicle, the brake rotor including a friction ring portion and a rotor mounting portion radially inward of the friction ring portion, the rotor mounting portion being formed on a radially inner circumference of the brake rotor and including a plurality of splines extending radially inward toward an axis of rotation of the brake rotor and a radially inward extending axial motion limiting feature disposed between each adjacent pair of the plurality of splines,
the method comprising the acts of:
locating a first portion of the plurality of mounting plates on a first side of the brake rotor, wherein each mounting plate of the first portion of mounting plates is aligned to straddle in a circumferential direction of the brake rotor at least one the plurality of splines and to axially overlap at least one of the plurality of axial motion limiting features;
passing the plurality of mounting fasteners axially through the plurality of mounting plates and the brake rotor;
locating a second portion of the plurality of mounting plates on a second side of the brake rotor, wherein each mounting plate of the second portion of mounting plates is aligned to straddle at least one of the plurality of splines and axially overlap at least one of the plurality of axial motion limiting features;
locating the brake rotor on the wheel hub, and
securing the brake rotor to the wheel hub with the plurality of fasteners, wherein
the axial motion limiting features include a surface configured to cooperate with at least one of the plurality of mounting fasteners and a bushing carried on the at least one mounting fastener to limit circumferential motion of the brake rotor relative to the wheel hub of the vehicle axle.

17. The method of claim 16, wherein
the brake rotor, the plurality of mounting fasteners and the first portion of mounting plates are assembled before the second portion of mounting plates are placed on the plurality of mounting fasteners.

18. The method of claim 16, wherein
the brake rotor is positioned by the plurality of mounting plates such that there is no direct contact between the brake rotor and the wheel hub.

19. The method of claim 16, wherein
the first portion of mounting plates and the second portion of mounting plates are circumferentially distributed on their respective first and second sides of the brake rotor such that at least one of the plurality of splines that not circumferentially straddled by a mounting plate on the first side of the brake rotor is circumferentially straddled by a mounting plate on the second side of the brake rotor.

20. The method of claim 16, wherein
the plurality of mounting fasteners are a plurality of studs and associated nuts,
the acts of passing the plurality of mounting fasteners axially through the plurality of mounting plates and the brake rotor and securing the brake rotor to the wheel hub with the plurality of fasteners includes assembling the plurality of studs to the wheel hub and the plurality of mounting plates and the brake rotor on the plurality of studs, followed by assembling the plurality of nuts on the plurality of studs.

* * * * *